United States Patent Office 3,476,191
Patented Nov. 4, 1969

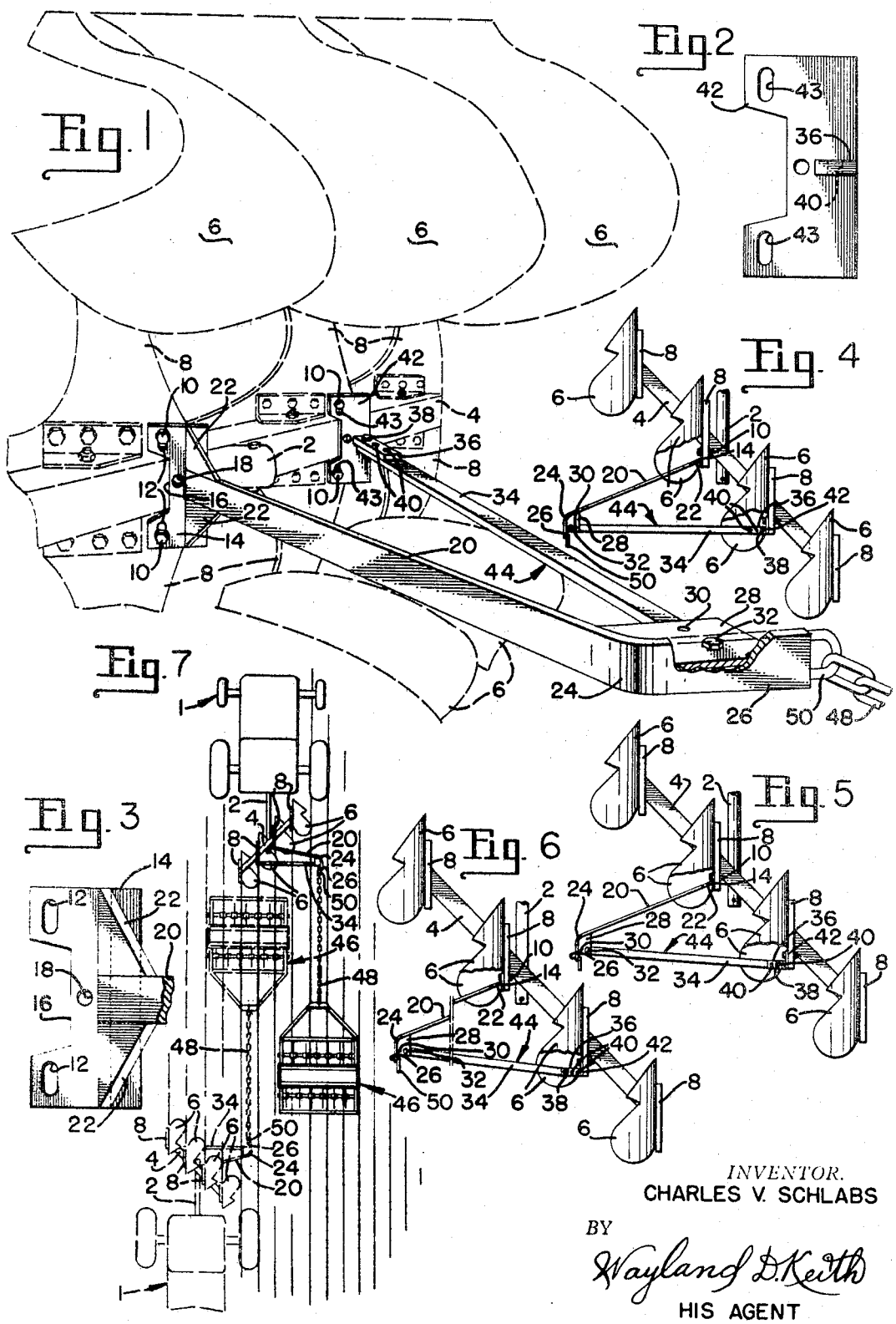

3,476,191
UNIVERSAL HITCH FOR TOWING TILLING
IMPLEMENTS
Charles V. Schlabs, Rte. 2, Hereford, Tex. 79045
Filed Aug. 22, 1966, Ser. No. 574,127
Int. Cl. A01b 49/02, 5/06
U.S. Cl. 172—162                                    10 Claims

ABSTRACT OF THE DISCLOSURE

A hitch bar which is adapted to be secured to a plow carrier bar on a two-way gang plow, which hitch bar extends outwardly on a side of a vertical plane passing longitudinally through a tractor for attachment of a second implement to be towed thereby, so upon reversal of the two-way plow, the distal end of the hitch bar is moved to the other side of the vertical plane passing longitudinally through the tractor, so that the implement towed therebehind will occupy the same position with respect to the area being plowed by the two-way gang plow and hitch bar.

---

This invention relates to improvements in hitch bars for tractors and, more particularly, to a universal hitch bar for attachment to two-way reversible gang plows on a tractor which enables the reversing of the plows with the pull point of the hitch bar remaining substantially in the same relative position but on the reverse side of the tractor to enable the pulling of harrows, clod crushers, and the like therebehind by a flexible element such as a chain, cable, or the like, without the aforementioned flexible element becoming entangled or twisted or wound around the hitch bar.

The present hitch bar is connected so as to be universally adaptable to a wide range of reversible plow carrier bars and which hitch bar will fit a wide range of sizes, such as 14 inch, 16 inch, and 18 inch two-way, reversible gang plows, as will be more fully brought out hereinafter. Furthermore, the hitch bar is adaptable to plows with varying "fore" and "after" clearances. The usual clearance is about 21 inches; however, some plows have "fore" and "after" clearances of 18 inches and others up to 24 inches. Therefore, the present hitch is so designed as to accommodate all of these conditions.

The present invention is composed of angulated bars that are connected so as to enable the mounting plates to be adapted to connect to the plow shanks on the plow carrier mounting bars so as to fit a variety of sizes and kinds of plows and yet present an outwardly extending universal hitch to which a towed implement may be connected for simultaneously tilling the soil as the ground is plowed.

Various hitch bars have been proposed heretofore, but these, for the most part, were of a construction which would fit on only one particular size and kind of plow which would require an implement dealer to stock a hitch bar for each individual size plow and each individual kind of reversible plow. However, with the present hitch, one hitch is adapted to fit practically all sizes and kinds of plows with a minimum of adjustment.

An object of this invention is to provide a universal hitch bar which may be attached to the plow carrier of a two-way, reversible gang plow so when the plows of the gang plow are reversed, the pull point of the universal hitch bar will be in the same relative position with respect to the longitudinal center line of the tractor but on the opposite side thereof.

Another object of the invention is to provide a universal hitch bar, a portion of which is longitudinally extensible and angularly variable to enable the universal hitch bar to fit the plow carriers of various kinds and sizes of plows.

Still another object of the invention is to provide a universal hitch bar for two-way, reversible moldboard gang plows which will enable the reversal of the plows while towing a second implement without the tow chain or cable becoming twisted or entangled in the hitch bar.

With these objects in mind and others which will become manifest as the description proceeds, reference is to be had to the accompanying drawings in which like reference characters designate like parts in the several views thereof, in which:

FIG. 1 is a fragmentary, perspective view of a portion of a plow carrier bar with moldboard plows thereon, which bar and plow are shown in dashed outline, and showing a universal hitch bar in full outline attached thereto, and showing portions broken away and in section to bring out details of construction, and showing a portion of a chain attached thereto;

FIG. 2 is an enlarged, elevational view of one of the mounting plates shown apart from the hitch bar;

FIG. 3 is an enlarged, fragmentary, elevational view of a second mounting plate and an end portion of one of the bars that make up the universal hitch bar assembly, with parts being shown in section;

FIG. 4 is a top plan view, on reduced scale, of a two-way, reversible moldboard plow assembly, with portions broken away to bring out details of construction and showing a universal hitch plow attached thereto;

FIG. 5 is a view similar to FIG. 4 but showing the universal hitch plow assembly being used on a larger size two-way, reversible moldboard plow assembly;

FIG. 6 is a view similar to FIG. 5, but of a universal plow hitch attachment on a plow of still larger size; and FIG. 7 is a top plan view on a further reduced scale of the plows attached to a tractor, and showing the universal hitch bar shown thereon, and showing the tractor, plows, hitch bar, and a clod crushing plow, in full outline, moving in one direction, and showing the tractor, plows, and universal hitch bar, in dashed outline, traveling in the opposite direction, and showing the arrangement of the plows and hitch bars when reversed with respect to the first mentioned hitch bar arrangement.

For a more detailed reference to the drawings, the numeral 1 designates generally a tractor, which is shown in full outline, traveling in one direction in FIG. 7, and is shown in dashed outline traveling in the opposite direction in FIG. 7. The tractor 1 has a draw bar 2 mounted thereon, which draw bar extends rearwardly and medially of the tractor 1 and rotatably mounts a plow carrier bar 4. The draw bar 2 may be raised in a conventional manner so as to enable the plow carrier bar 4 to be rotated to 180 degrees so as to enable the plows 6, which are mounted on plow shanks 8, to be rotated from the position shown in full outline in FIG. 7, to the position shown in dashed outline therein. However, the plow 6 would normally be in an upstanding position, as shown in FIG. 1, with parts having been broken away to show the manner of mounting the universal hitch bar in the position which is shown in full outline.

The plow carrier bar 4, in the present instance, is shown in FIGS. 1, 4, 5, 6 and 7 to be mounted at a 45 degree angle and has the plow shanks 8 each having a plane face thereon, each which plane face is substantially parallel to the axis of the draw bar 2. Each of the plow shanks 8 has holes above and below the plow carrier bar 4, through which holes mounting bolts 10 are adapted to pass with the bolts passing through openings therein, such as slots 12, to bindingly engage a mounting plate 14 to the plow shanks 8. The mounting plate 14 is notched, as indicated at 16, so as to straddle plow carrier bar 4, thereby to enable the mounting plate 14 to be secured thereto. A hole 18 is provided intermediate the ends of mounting plate 14 to provide additional holes to accommodate bolts in some types of plow mounting bars. A bar 20 is secured to mounting plate 14 and extends outward and substantially at a 45 degree angle, with gusset plates 22 being secured to the top and bottom of the outwardly extending bar 20 and to the mounting plate 14, as by welding. The bar 20 has a bend 24 formed therein near the outer terminal end thereof with the end 26 of the bar 20 lying in a plane substantially parallel to the axis of draw bar 2.

An apertured reinforcing plate 28 is provided near the outer terminal end of bar 20 to reinforce the bar and, at the same time, a plurality of holes 30 are provided therein for adjustment of a bolt 32 to enable the longitudinal movement of a brace rod 34, which extends between apertured reinforcing plate 28 and outwardly extending apertured lug 36, which enables the connection of brace rod 34 to the outwardly extending apertured lug 36 by a bolt 38, as will best be seen in FIG. 1. The outwardly extending apertured lug 36 has a plurality of holes 40 therein which enables the longitudinal adjustment of brace rod 34 with respect thereto.

A second mounting plate 42 has openings 43 therein, some of which openings are preferably slotted to accommodate variations of hole centers, which mounting plate 42 is secured to a plane face of the plow shanks 8 on the opposite side of the axial draw bar 2. The outwardly extending apertured lug 36 is secured to the mounting plate 42 at substantially right angles thereto and with the broad face of the outwardly extending apertured lug 36 lying in a plane at right angles to a plane in which the face of the outwardly extending bar 20 lies. The bar 20 is maintained in relatively fixed relation to the face of the plow shanks 8 by mounting bolts 10. However, by moving bolts 32 and 38 into different holes 30 and 40 in apertured reinforcing plate 28 and outwardly extending apertured lug 36, the angularity of brace rod 34, with respect to bar 20, may be changed and yet maintain a rigid, braced relation for pulling an implement behind two-way, reversible moldboard plows. In this manner, the universal hitch bar, designated generally by the numeral 44, may be attached to relatively small plows such as 14 inch plows, as shown in FIG. 4. Then, by moving the bolts 32 and 38 to other holes, a plow of a larger size, as shown in FIG. 5, may be accommodated; and by moving bolts 32 and 38 to other holes, as shown in FIG. 6, the universal hitch bar 44, may be adapted to pull larger plows and still give a rigid connection for pulling a tilling implement 46, such as a clod crusher, harrow, or the like, by a flexible towing element such as a chain 48. The chain 48 is preferably attached directly to the distal end of bar 20, or the chain 48 may be connected to the bar 20 by a swivel or loop 50 secured to the distal end 26 of bar 20. An upper portion of the plows 6, in FIGS. 4, 5 and 6, is shown to be broken away to show the various modes of attachment of mounting plates 14 and 42 on the plow shanks 8 which extend upward and downward from plow carrier bar 4.

Operation

With the universal hitch bar, designated generally at 44, installed on the plow carrier bar 4 so as to extend laterally outward the desired distance, a chain 48 is attached to loop 50 so as to pull a tilling implement 46, such as a clod crushing plow, harrow, or the like, so that the tilling implement 46 will till a land of substantially the same width as is being plowed. It is preferable to let the tilling implement 46 overlap onto previously plowed ground; however, when the ground has been broken to the predetermined length, as, for instance, the end of the field, the tractor 1 is turned around and the draw bar 2 is raised by a conventional lift (not shown); whereupon, the plow carrier bar 4 and plow 6 are reversed by either manually rotating the plow carrier bar 4 about the axis of draw bar 2 or by using a rotary hydraulic cylinder or the like. The plows that have been engaged in the ground are then rotated 180 degrees to occupy a position as indicated in FIG. 1, at the upper side of the figure; and the plows that were previously on the upper side of the plow carrier bar 4 are rotated to occupy a position on the lower side thereof, so that the tractor 1 may be driven over a land immediately adjacent the plowed portion.

Upon rotation of the plow carrier bar 4 and plows 6, as set out above, the universal hitch bar 44 will be moved from the position, as shown in full outline in FIG. 7, to that shown in dashed outline therein. Whereupon, the tilling implement 46, which is being towed by a chain 48 which is attached to the universal hitch bar 44, will occupy the position as shown in dashed outline in FIG. 7, which will enable the tilling implement 46 to be towed with a minimum of attention and without having to manipulate the universal hitch bar 44 to change its position other than rotating the plow carrier bar 4 and plow 6 about the axis of draw bar 2.

Having thus clearly shown and described the invention, what is claimed as new and desired to be secured by Letters Patent is:

1. A universal hitch bar for use with a plow attached to a tractor, which hitch bar comprises;
   (a) a first mounting plate, which plate is apertured,
   (b) a bar secured to and extending laterally from said first apertured mounting plate, at an acute angle with respect thereto,
      (1) said bar having an end thereof extending at an angle with respect to the main portion of the bar,
   (c) a reinforcing plate secured to said bar at the angulated end thereof,
      (1) said reinforcing plate having an aperture formed therein,
   (d) a second apertured mounting plate,
   (e) a lug mounted on said second apertured mounting plate and extending outward therefrom and being substantially perpendicular thereto,
      (1) said lug having at least one aperture formed therein,
   (f) an elongated brace bar detachably secured, at one end to said apertured lug,
      (1) said elongated brace bar having apertures formed therein,
   (g) the other end of said elongated, apertured brace bar being detachably secured to said apertured reinforcing plate, and,
   (h) connection means associated with the distal end of said first mentioned bar.

2. A universal hitch as defined in claim 1; wherein
   (a) said lug on said second apertured mounting plate has a multiplicity of apertures formed therein which are spaced apart longitudinally thereof, and
   (b) bolt means passing through a certain aperture in said apertured lug and through an aperture in said brace bar to bindingly engage said elongated, apertured brace bar to said lug.

3. A universal hitch as defined in claim 1; wherein
   (a) said reinforcing plate has a plurality of spaced apart apertures formed therein, and
   (b) bolt means passing through a certain aperture in said apertured reinforcing plate and an aperture in said elongated apertured brace bar to secure said brace bar in adjusted, fixed relation with respect to said reinforcing plate.

4. A universal hitch bar as defined in claim 1; wherein
   (a) said lug on said mounting plate has a multiplicity of apertures formed therein and spaced longitudinally thereof,
   (b) bolt means passing through a certain aperture in said apertured lug and through an aperture in said brace bar to bindingly engage said elongated, apertured brace bar in adjusted, fixed relation with respect to said lug,
   (c) said reinforcing plate having a plurality of spaced apart apertures formed therein, and (d) bolt means passing through a certain aperture in said apertured reinforcing plate and an aperture in said elongated, apertured brace bar to secure said brace bar in adjusted, fixed relation with respect to said reinforcing plate.

5. A universal hitch for use in combination with a tractor having a plow carrier bar associated therewith, which carrier bar has plane faces thereon, on which to mount the shanks of two way plows; which universal hitch comprises:
 (a) a first apertured mounting plate,
 (b) a hitch bar secured to said first apertured mounting plate and extending outwardly therefrom,
  (1) an apertured plate on the distal end of said hitch bar,
 (c) said first mounting plate being adapted to be secured to the plow carrier bar so that the outwardly extending hitch bar will be substantially perpendicular thereto,
 (d) a second apertured mounting plate,
  (1) an outwardly extending lug secured to said second apertured mounting plate,
 (e) an elongated, apertured brace bar,
  (1) bolt means securing one end of said elongated apertured brace bar to said lug on said second apertured mounting plate in pivoted relation,
  (2) bolt means securing the other end of said elongated, apertured brace bar to said apertured plate on the distal end of said hitch bar in pivoted relation to enable the angularity between said bars to be varied,
 (f) the distal end of said hitch bar, when mounted on a two way plow, being adapted to swing about a substantially horizontal axis from one side of a vertical plane, passing longitudinally through the tractor, to the other side of the plane, and
 (g) connection means associated with the distal end of said hitch bar to enable a tilling implement to be connected thereto.

6. A universal hitch as defined in claim 5; wherein
 (a) said first apertured mounting plate and said second apertured mounting plate are each detachably secured to the spaced apart plane surface plates on the plow carrier bar, so said mounting plates are substantially parallel, and
 (b) the angularity between the hitch bar and said apertured brace bar being variable by positioning said bolt means in different apertures in said elongated brace bar, said apertured lug on said second apertured mounting plate, and said apertured plate on the distal end of said hitch bar to change the pull point of said connection means with respect to the vertical medial plane passing longitudinally through the tractor.

7. A universal hitch bar as defined in claim 6; wherein
 (a) a slotted first mounting plate is fixedly secured to the plane surface plates on the carrier bar adjacent the plows, and
  (1) said first mounting plate having a notch formed therein intermediate the length thereof to complementally receive a portion of the plow carrier bar therebetween.

8. A universal hitch as defined in claim 7; wherein
 (a) said second mounting plate has a notch formed therein intermediate the length thereof to complementally receive a portion of the plow carrier bar therein.

9. A universal hitch as defined in claim 8; wherein
 (a) said hitch bar extends laterally behind a plurality of mold board plows thereby to tow a second tilling implement over the ground plowed by the plurality of mold board plows.

10. A universal hitch as defined in claim 8; wherein
 (a) the second tilling implement is detachably connected to said connection means at a hitch point on said hitch bar so when said two-way, mold board plows are reversed, the hitch point will be equidistant on the opposite side of a vertical plane passing longitudinally through the tractor on which the plows are mounted.

References Cited

UNITED STATES PATENTS

| 790,769 | 5/1905 | Wilberg | 172—202 X |
| 998,823 | 7/1911 | Wilbur | 172—202 |
| 1,165,527 | 12/1915 | Minier | 172—202 |

FOREIGN PATENTS 1,356,464  2/1964  France.

EDGAR S. BURR, Primary Examiner

U.S. Cl. X.R.

172—182, 202, 224